(12) United States Patent
Roberts

(10) Patent No.: US 6,202,637 B1
(45) Date of Patent: Mar. 20, 2001

(54) WATER SMOKER GRILL WITH AUTOMATIC WATER REPLENISHMENT

(76) Inventor: Jon L. Roberts, 529 Clear Spring Rd., Great Falls, VA (US) 22066

( * ) Notice: Subject to any disclaimer, the term of this patent is extended or adjusted under 35 U.S.C. 154(b) by 0 days.

(21) Appl. No.: 09/246,301

(22) Filed: Feb. 8, 1999

(51) Int. Cl.[7] .................................................. A21B 1/08
(52) U.S. Cl. ........................ 126/20; 126/380.1; 126/376; 99/340
(58) Field of Search ....................... 99/340, 417; 126/20, 126/376, 369, 380.1; 137/453, 571

(56) References Cited

U.S. PATENT DOCUMENTS

| | | | |
|---|---|---|---|
| 867,660 | 10/1907 | Johnson | 126/380.1 |
| 970,289 | * 9/1910 | Allen | 126/20 |
| 1,253,146 | 1/1918 | Caskey, Jr. | 126/380.1 |
| 1,261,878 | 4/1918 | West | 126/380.1 |
| 1,332,016 | * 2/1920 | Wolff | 126/369 |
| 1,381,800 | * 6/1921 | Clefton | 126/20 |
| 1,389,241 | * 8/1921 | Clefton | 126/20 |
| 3,299,800 | * 1/1967 | Angelo | 126/20 |
| 3,967,613 | * 7/1976 | Rybak et al. | 126/41 R |
| 4,426,923 | * 1/1984 | Ohata | 126/20 |
| 4,655,192 | * 4/1987 | Jovanovic | 126/20 |
| 4,672,944 | 6/1987 | Curry | 126/25 R |
| 4,787,364 | 11/1988 | Zepeda | 126/41 R |
| 5,320,028 | * 6/1994 | Grunberg | 126/369 |
| 5,515,773 | * 5/1996 | Bullard | 126/20 |
| 5,680,810 | * 10/1997 | Sham | 126/20 |

* cited by examiner

Primary Examiner—Carroll Dority
Assistant Examiner—David Lee
(74) Attorney, Agent, or Firm—Roberts Abokhair & Mardula, LLC

(57) ABSTRACT

A method and apparatus for replenishing the water supply in a water pan of a water smoker grill. An external water supply is permanently or removably attached to the side of a water smoker grill. A water supply tube extends from the external water supply into the water pan of the water smoker grill. As water is boiled off from the water pan and the level in the water pan descends below a minimum level below the level of the outlet tube, water is allowed to replenish the water supply in the water pan, thereby increasing the cooking time without having to remove the lid of the water smoker grill to replace the water.

14 Claims, 3 Drawing Sheets

WATER SMOKER GRILL WITH AUTOMATIC WATER REPLENISHMENT

FIELD OF THE INVENTION

This invention relates generally to improvements to charcoal and electric water smoker grills. More particularly, this invention is an automatic water replenishment system for replenishing the water supply in a water smoker grill.

BACKGROUND OF THE INVENTION

Water smoker grills are used along with barbecues to provide a different type of cooking method for meats and vegetables. It is well known that a water smoker grill uses some form of heat source, usually electrical, gas or charcoal, to boil water which then cooks the meat or vegetables in question. In order to add flavor to the food being cooked, flavored chips of varying types are placed in the heat source, and the smoke particles from these flavor chips then provide a pleasing smoky flavor to the food being cooked.

The heat source in the water smoker grills heats a pan of water which then boils, providing heat and moisture which aids in the cooking of the food in question.

Existing water smoker grills allow the water pan to be filled either through a side opening where water must somehow be poured into the pan or, as is frequently the case, the user simply raises the top or lid of the smoke grill and pours water down into the pan.

The difficulty with water smoker grills is that the water supply in the pan boils away, requiring the pan to be refilled periodically during the course of cooking. Whenever this must be done, the refill method is awkward and can result in water being poured on the food being cooked, or the water might partially go into the water pan and partially onto the heat source, thus extinguishing the heat source, or in the case of an electrical grill, water will fall upon the electrical element, potentially causing damage to the element. In addition, raising the lid of the water smoker grill lets heat out of the grill. Thereafter, for cooking to continue, the heat must build up inside the grill over a period of time. Thus, cooking is interrupted while water is being added to the water pan. Failure to refill the water pan at the appropriate time results in the food being over cooked and dried out.

What would be useful is a method of refilling the water pan such that water will not get onto the heat source, or the food during replenishment of the water supply. This would lend itself to a more even cooking of the food and would also allow the water smoker grill to cook in an unattended fashion for a longer period of time since water will not be needed midway through the cooking process.

SUMMARY OF THE INVENTION

It is therefore an object of the present invention to permit a convenient refilling of the water pan in water smoker grills.

It is a further object of the present invention to allow refilling of the water pan without halting the cooking process.

It is a further object of the present invention to allow water to refill the water pan in water smoker grills without the water being poured onto the food being cooked.

It is a further object of the present invention to allow water smoker grills to cook for longer unattended periods.

These and other objectives of the present invention will become apparent to those skilled in the art by review of the specification and claims that follow.

The present invention comprises both a new type of water smoker grill as well as a retrofit apparatus for existing water smoker grills which allows automatic water replenishment of the water pan in a water smoker grill.

The present invention comprises a water compartment or container permanently or removably affixed to the side of a water smoker grill which holds additional water which is to be supplied to the water pan when the water in the water pan boils off during the cooking process. A tube extends downward from the water supply through the side of the water smoker grill into the water pan, where the end of the tube is submerged below the water level in the water pan. As water boils off out of the water pan during the cooking process, the end of the supply tube is exposed and water is permitted to enter the water pan until the end of the tube is again submerged in the water. Thus, a constant level of water is maintained in the water pan during the cooking process.

The additional water supply can be in the form of a compartment that is welded onto the side of the water smoker grill, thereby creating a complete integrated unit where the user simply fills the water pan and places the water pan in the bottom of the water smoker grill and adds an additional water supply through the supply container. Alternatively, water can simply be poured into the supply container and allowed to enter the water pan until the desired level in the water pan is achieved.

In an alternate embodiment, using the same concept, an auxiliary water supply is affixed to the side of the water smoker grill in a removable fashion. Removable affixing is via a hook that hooks onto the top ledge of the water smoker grill or through some hooks on which the auxiliary water supply is hung. In the latter case, the hooks may be affixed to the side of the water smoker grill and the water supply can simply hang on those hooks. In this case, the additional water supply can be sold as an option.

As cooking takes place, water is gradually added to the water pan, thereby assuring a constant water supply source during the cooking process. Further, since the lid of the smoker need not be raised, the heat is constantly applied to the food being cooked, thereby enhancing the cooking without having any fluctuation in the heat during the course of cooking. Further, the present invention allows water to be delivered directly to the water pan, thereby avoiding spillage on the very heat source that is heating the water pan. This again lends itself to a more even cooking procedure. Finally, since the need for water is gradual during the cooking process, the water smoker grill can cook in an unattended fashion for many hours longer than would ordinarily be possible if the water pan had to be refilled partway through the cooking process.

The water source or container can be made from metal, pyrex, aluminum, or any other material that is heat resistant and which can exist in close proximity to the water smoker grill sides which will be hot due to the cooking process.

The present invention is more thoroughly described by the figures that follow.

DETAILED DESCRIPTION OF THE INVENTION

As noted above, the present invention is an additional water supply for water smoker grills that augments the water supply in the water pan. In concept the additional water supply can be an integrated water supply manufactured with the water smoker grill, or a removable water supply that can be added. In either case, the water supply operates to gradually replenish the water supply in the water pan of the water smoker grill as that water is boiled away during the cooking process.

Figure 1:
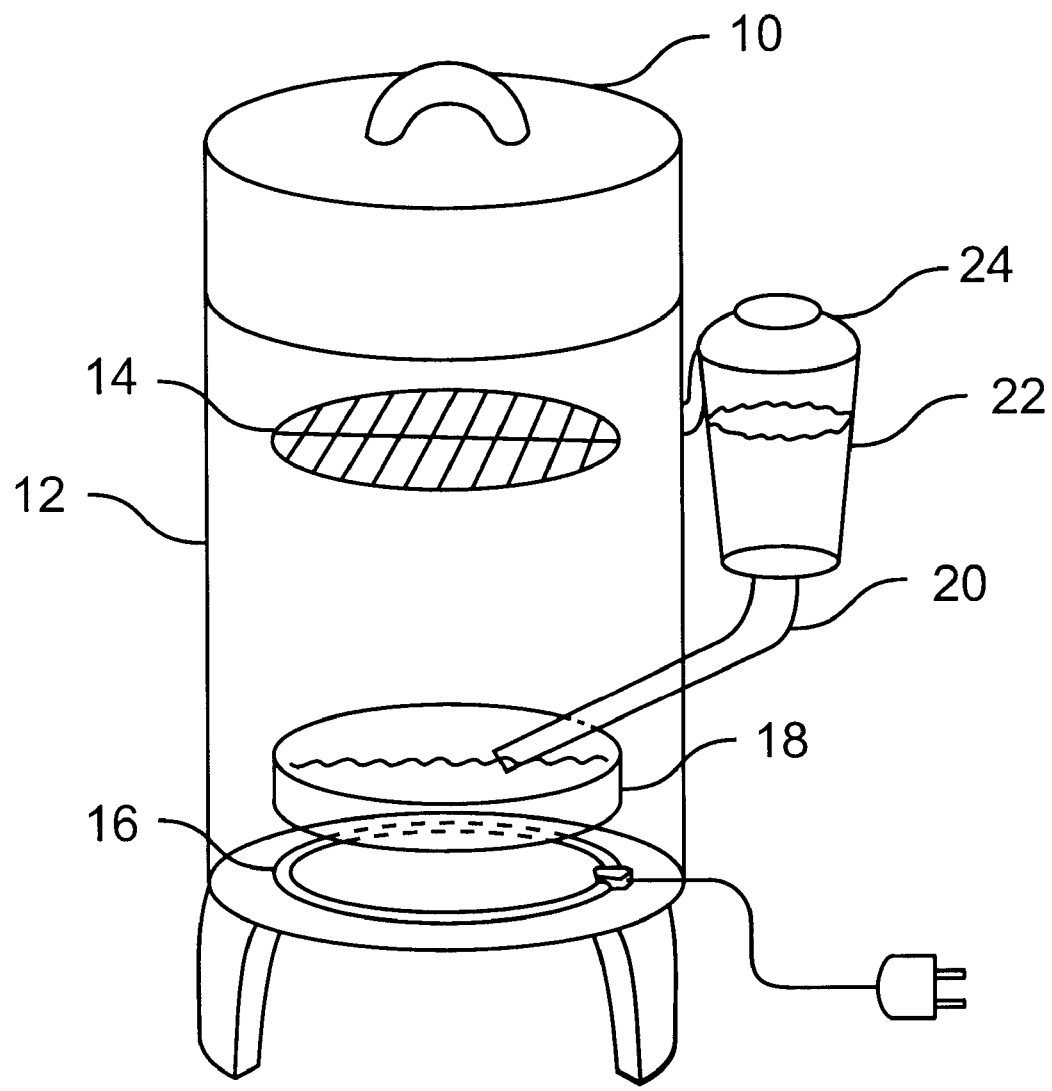
FIG. 1 illustrates a cutaway view of a water smoker grill with the removable water supply attached.

Referring to FIG. 1, a cutaway view of the present invention with a removable additional water supply is shown. Water smoker grill 12 comprises a top 10, a heat source 16, water pan 18, a grill 14 for supporting the food. All of these components are known in the art. The present invention is a water smoker grill that further comprises an additional water supply 22 having a feed tube 20 that extends through the side of the water smoker grill 12 into the water pan 18 to below the water level of the water in the water pan. The additional water supply 22 also has a cap 24 which prevents air from getting into the water supply, however, this is not strictly required and is not meant as a limitation. For example, the additional water supply can be a sealed sanitary container that is filled with water and then upended into position for feeding the water into the water pan.

In practice, as the water in the water pan 18 is boiled away by the heat source 16, the level of the water in the water pan 18 descends below the outlet end of the water supply tube 20. This allows air to enter the tube and allow water from the water supply 22 to be released into the water pan 18. When the water level reaches just above the level of the water supply tube 20, the water supply will stop feeding the water pan 18. In this fashion, the water supply of water pan 18 will constantly be replenished during the course of cooking.

It is important to note that the heat supply 16 can be either electrical, gas, or charcoal, all of which are suitable heat sources for water smoker grills. Hence, the heat source is not meant as a limitation.

Figure 2:
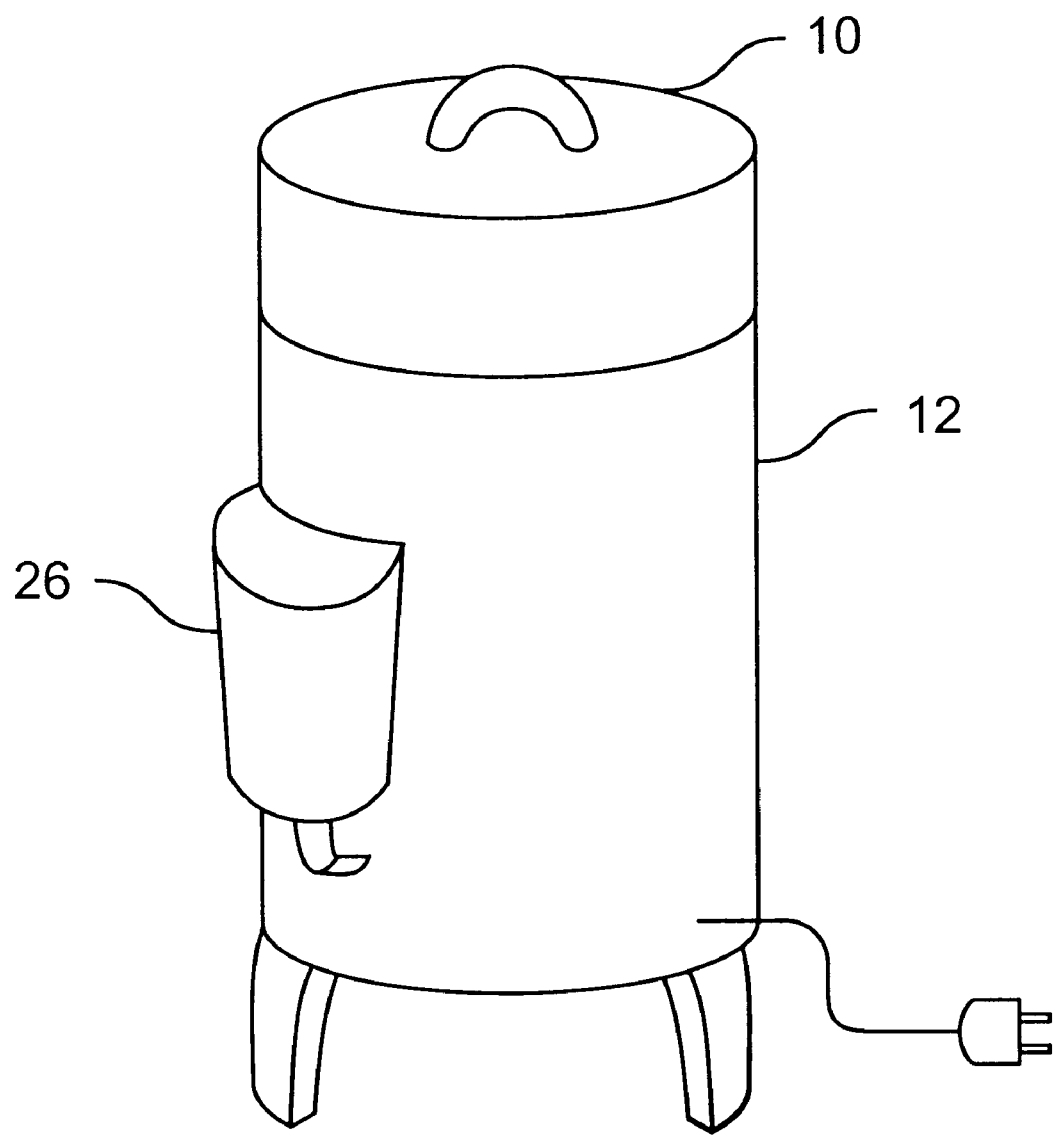
FIG. 2 illustrates a water smoker grill with an integrated water supply attached to the grill.
Figure 3:
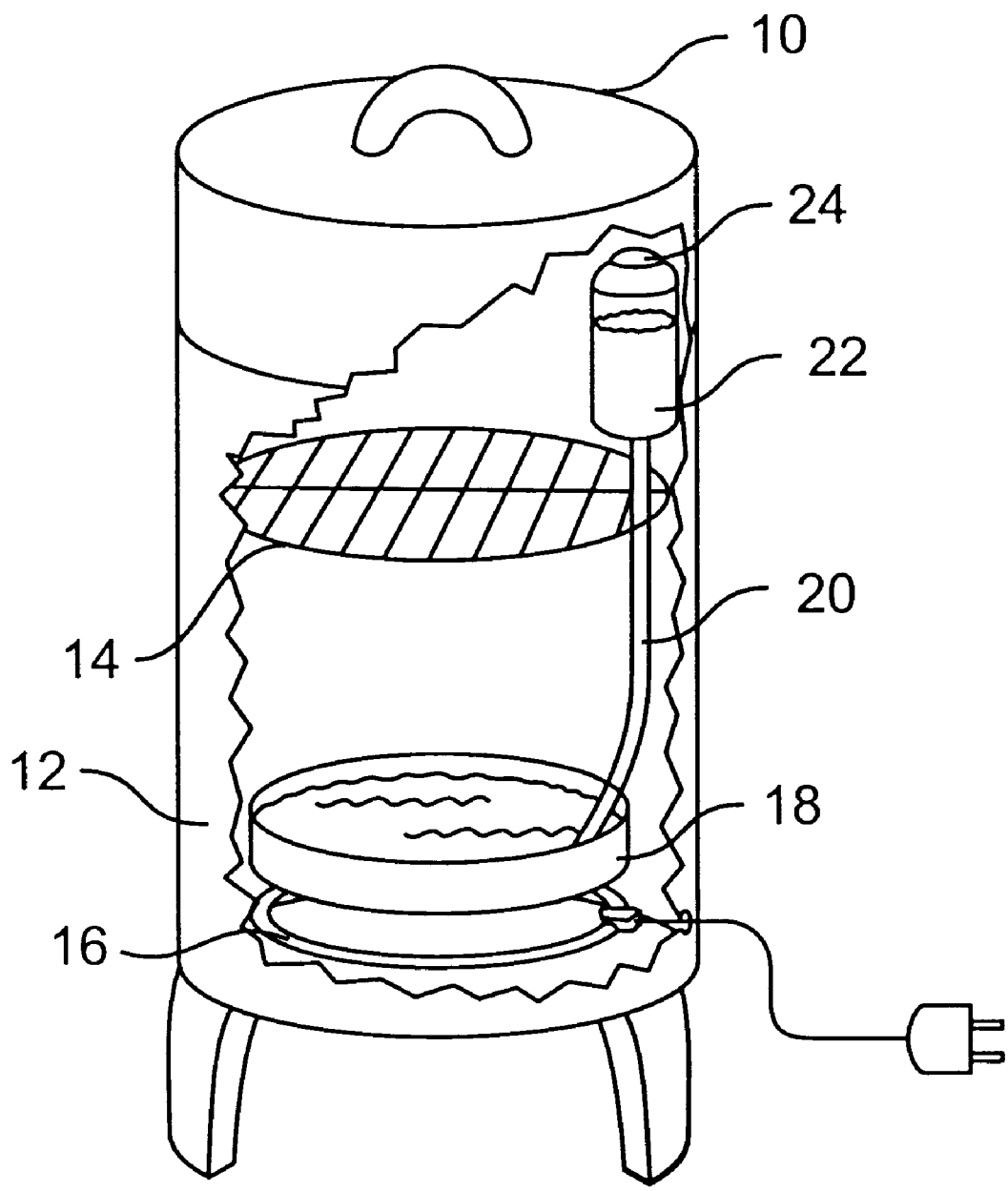
FIG. 3 illustrates a cutaway view of a water smoker grill with the removable water supply attached inside the grill body according to an alternate embodiment of the invention.

Referring to FIG. 2, a water smoker grill having an integrated water supply permanently affixed to the water smoker grill is shown. In this case, water smoker grill 12 comprising top lid 10 has all of the components described in FIG. 1. The water smoker grill of FIG. 2 however has integrated water supply 26 which is permanently affixed to the side of the water smoker grill during manufacturing. Additional water supply 26 is filled by the user at the beginning of the cooking process and serves as a way to fill the water pan 18 (not shown). When the water supply in the water pan 18 is filled and additional water is placed in the water supply 26, a lid is closed over the water supply to keep air from getting into the water supply 26. Thereafter, replenishment of the water pan 18 occurs in the same fashion as previously described. Referring to FIG. 3, the water supply 22 is disposed inside the grill 12.

The water supply is preferably made from some heat resistant material, such as stainless steel, aluminum, pyrex, or indeed any other material that is capable of holding water yet will also resist the heat from the water smoker grill. Similarly, the water supply tube that extends from the water supply into the water pan is also made from some heat resistant material so that the heat from the cooking does not melt or otherwise impair the flow of water from the water supply into the water pan.

In alternate embodiments, the additional supplies may be internal to the body of the water smoker grill and refill the water pan in the same way described above.

It will be appreciated by those skilled in the art that other methods of supplying water to the water pan may be possible without departing from the scope of the invention as disclosed. Therefore, the scope of the invention is only limited by the claims that follow.

I claim:

1. A water smoker grill comprising:
   a water smoker grill body, generally opened at one end and closed at a second end;
   a lid resting on the open end;
   a cooking surface suspended inside the body for holding food to be cooked;
   a water pan for holding water supported inside the body below the cooking surface;
   a heat source to supply heat to generate smoke and to boil the water in the water pan supported inside the body below the water pan for heating the water in the water pan; and
   an additional water supply reservoir attached to the body for providing water to the water pan during the cooking process as the water in the water pan is boiled away during cooking, wherein the additional water supply reservoir is disposed inside the body and is attached at an inside surface of the body.

2. The water smoker grill according to claim 1, wherein the heat source is selected from the group consisting of charcoal fired heat, electrical produced heat, and gas produced heat.

3. The water smoker grill according to claim 1, wherein the additional water supply reservoir is removably attached to the body.

4. The water smoker grill according to claim 1, wherein the additional water supply reservoir is permanently attached to the body.

5. The water smoker grill according to claim 4, wherein the additional water supply reservoir further comprises a water supply tube extending into the water pan.

6. The water smoker grill according to claim 1, wherein the additional water supply reservoir is made from heat resistant material.

7. The water smoker grill according to claim 6, wherein the heat resistant material is selected from the group consisting of stainless steel, steel, pyrex, and aluminum.

8. A method of cooking food in a water smoker grill comprising:
   boiling water in a water pan inside a water smoker grill body;
   replenishing the water in the water pan gradually during cooking using an additional water supply reservoir that is disposed inside the water smoker grill body and is attached to an inside surface of the body;
   the additional water supply reservoir replenishing water when the water level in the water pan decreases below a minimum level.

9. The method of cooking in a water smoker grill of claim 8, wherein the additional water supply reservoir comprises a container made from heat resistant material.

10. The method of cooking in a water smoker grill of claim 8, wherein the heat resistant material is taken from the group consisting of pyrex, steel, stainless steel, and aluminum.

11. The method of cooking in a water smoker grill according to claim 8, wherein replenishing the water supply further comprises a heat resistant tube extending into the water pan and the water being replenished into the water pan when the level of the water in the water pan reaches a level below an outlet of the water supply tube.

12. A water smoker grill comprising a water smoker grill body, generally opened at one end and closed at a second end:

a lid resting on the open end;

a cooking surface suspended inside the body for holding food to be cooked;

a water pan for holding water supported inside the body below the cooking surface;

a heat source to supply heat to generate smoke and to boil the water in the water pan supported inside the body below the water pan for heating the water in the water pan; and an additional water supply reservoir disposed inside the body and unitarily incorporated with the body for providing water to the water pan during the cooking process as the water in the water pan is boiled away during cooking.

13. The water smoker grill according to claim 12, wherein the heat source is selected from the group consisting of charcoal fired heat, electrical produced heat, and gas produced heat.

14. The water smoker grill according to claim 12, wherein the additional water supply reservoir further comprises a water supply tube extending into the water pan.

* * * * *